Jan. 2, 1968 — P. KUTTNER — 3,361,028

SPECTROPOLARIMETER

Filed March 21, 1963 — 2 Sheets-Sheet 1

INVENTOR:
Paul Kuttner,
BY Singer, Stern & Carlberg,
ATTORNEYS

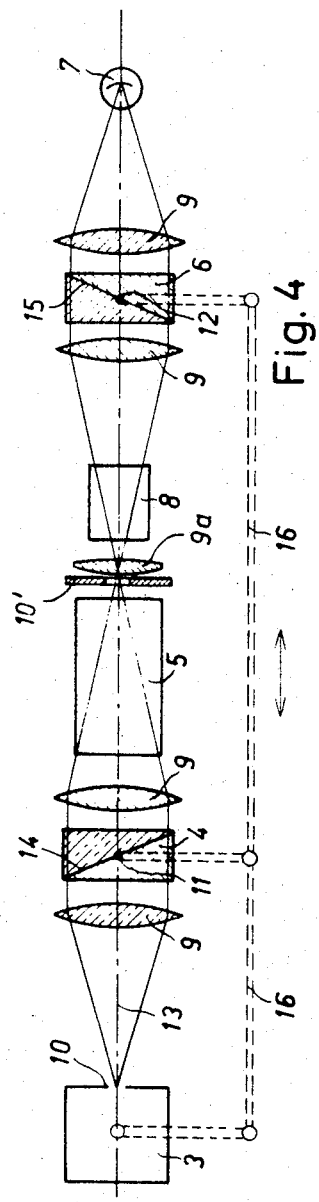
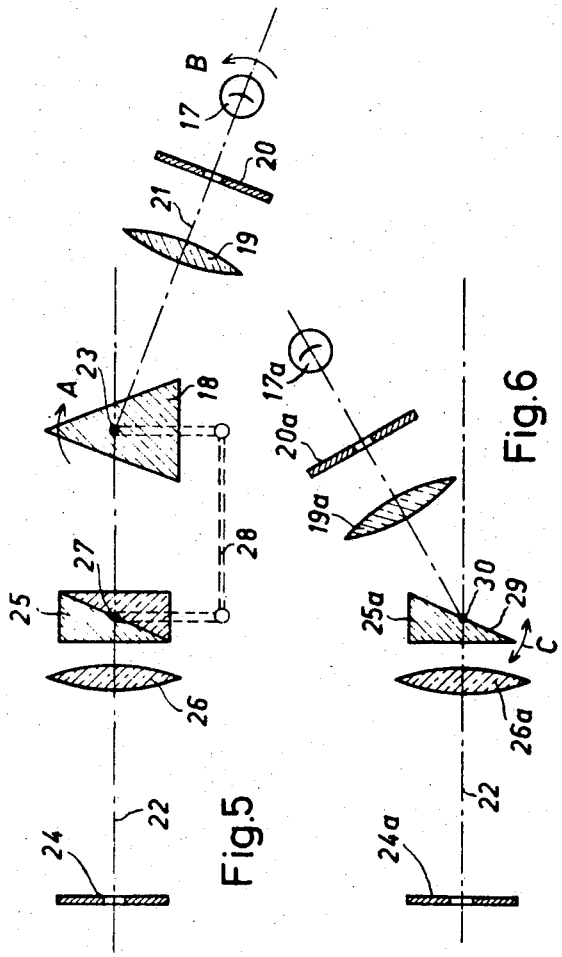

United States Patent Office 3,361,028
Patented Jan. 2, 1968

3,361,028
SPECTROPOLARIMETER
Paul Kuttner, Innsbruck, Austria, assignor to Carl-Zeiss-Stiftung, doing business as Carl Zeiss, Wurttemberg, Germany, a foundation established under the laws of Germany
Filed Mar. 21, 1963, Ser. No. 267,048
Claims priority, application Germany, Mar. 23, 1962, Z 9,319
9 Claims. (Cl. 88—14)

The invention relates to a spectropolarimeter whose principal parts consist of a monochromator, a polarizer and an analyzer, for instance of the plate or prism type, while the photosensitive receiver consists, for example, of a photocell and optical elements. The test specimen to be examined is arranged between the polarizer and the analyzer.

In spectropolarimeters of this kind it is customary to employ prisms of the Glan-Thompson type as polarizers. These prisms consist of two parts which are cemented together with their inclined prism faces or hypotenuses, the parts being made of calc-spar crystal. It is, however, of advantage when the parts are not cemented in the ultraviolet range but remain separated by a thin air space: Such polarizers are called Glan-prisms or Glan-polarizers. The polarizing effect of such a Glan prism is such that the ordinary light beam is totally reflected by the hypotenuse face, while the extraordinary light beam passes therethrough.

The FIGS. 1 and 2 explain the angular relations for a Glan prism and the limits which exist for working with a Glan prism polarizer, particularly with respect to the wavelength range.

Referring to FIG. 1, the upper part 1 of the Glan prism has a side length $k$, a height $l$ and an angle of intersection $s$. The optical axis of the instrument is designated with 2. Geometry teaches that $$\alpha + \rho_1 = \beta - \rho_2 \quad (1)$$

When $\alpha$ and $\beta$ are the critical angles of total reflection and $\omega$ and $\epsilon$ are the refraction indices for the ordinary and extraordinary light rays, respectively, then $$\sin \alpha = 1/\omega \text{ and } \sin \beta = 1/\epsilon \quad (2)$$

The law of refraction teaches that $$\sin i_1 = \omega \sin \rho_1 \text{ and } \sin i_2 = \epsilon \sin \rho_2 \quad (3)$$

When the angle of incidence is larger than $i_1$ the ordinary light ray is permitted to pass through, but when the angle of incidence is larger than $i_2$ the extraordinary light ray is reflected. The largest possible generating angle $i_1 + i_2$ is constructively obtained when $i_1 = i_2$, namely when the beam of light is symmetrical to the optical axis 2. Owing to the wavelength dependency of $\omega$ and $\epsilon$ this is possible only for one wavelength. The Equations 1 and 3 show that also $s$ for $i_1 = i_2$ is dependent of the wavelength. Corresponding results are effective for other prism polarizers and also plate-type polarizers.

FIG. 2 discloses the angles $i_1$ and $i_2$ in dependency from the wavelength $\lambda$ of the incident light rays. The full lines apply for a commercial Glan prism in which $i_1 = i_2$ and $\lambda = 589$ Nm. The angle of intersection in this example is $s = 39°32'$. The permissible generating angle of this symmetric prism for $\lambda = 589$ Nm. is $\pm 4°5'$. This generating angle can only be fully exploited when $\lambda = 589$ Nm., because when the wavelengths are shorter, also a portion of an extraordinary light ray is reflected which corresponds to angles of incidence lying above the full line characteristic $i_2$, while when the wavelengths are longer a portion of the ordinary light beam is passed which corresponds to angles of incidence lying above the full line characteristic $i_1$. Therefore, if the wavelengths are shorter than 589 Nm. the transmission is smaller, and if the wavelengths are longer than 589 Nm. the degree of polarization is smaller, when the entire generating angle is used for which the instrument is designed. Upon restriction of the permissible generating angle, for instance, to 3°20' one is able to work with a greater wavelength range, for instance from $\lambda = 400$ Nm. to $\lambda = 1000$ Nm. If now the constant light flux $\phi$, determined by the monochromator, is to be exploited, which light flux $\phi$ is proportional to the product of surface and generating angle, then upon a restriction of the generating angle the surface of the Glan prism has to be increased correspondingly. However, such a restriction of the generating angle is limited in the known polarimeters for geometric optical reasons.

It is an object of the invention to create a spectropolarimeter which permits a working within a great wavelength range, for instance from 200 or 300 Nm. to 1000 Nm., without lessening the transmission and the degree of polarization, and exploitation of substantially the entire constant light flux of the monochromator.

The spectropolarimeter of the invention comprises a monochromator, a polarizer, an analyzer, and a photosensitive receiver.

One embodiment of the invention comprises a spectropolarimeter in which analyzer lenses are arranged in front and in rear of the polarizer. The arrangement of these lenses is such that the polarizer and the analyzer are penetrated by the parallel light ray and that the monochromator slot is imaged between these two members.

According to a second embodiment of the invention the polarizer and analyzer consist preferably of the Glan-prism type and the angle of intersection $s$ of the polarizer and the analyzer is so large that $i_1$ for $\lambda = \lambda_{max}$ is approximately equal to $i_2$ when $\lambda = \lambda_{min}$, whereby $i_1$ and $i_2$ constitute the angles of incidence of the ordinary and extraordinary light beams directed onto the prisms. These angles correspond to the critical angles of total reflection, while $\lambda_{min}$ and $\lambda_{max}$ are the shortest and the longest wavelength, respectively, of the wavelength range within which the working takes place.

According to a third embodiment of the invention a second monochromator having an inlet slot and an outlet slot is arranged between the analyzer and the photosensitive receiver, whereby the slot image of the first monochromator forms the inlet slot, while the lens arranged in front of the analyzer and producing the parallel ray image beam forms the first lens of the second monochromator.

According to a fourth embodiment of the invention the spectropolarimeter is provided with means for rotating the polarizer about an axis which is arranged parallel to the common edges of the two prisms. The polarizer is rotated in dependence of the wavelength $\lambda$ of the light leaving the monochromator in such a manner that the full permissible generating angle of the polarimeter is used without diminishing the degree of polarization and the transmission of light, and that means are provided for a corresponding rotation of the analyzer. Preferably, the means for rotating the polarizer are connected with the means for rotating the analyzer and both these means may be connected with means for rotating the prism belonging to the monochromator.

With these and other objects in view the invention will now be described in more detail with reference to the accompanying drawings, in which:

FIG. 4 illustrates diagrammatically one embodiment of a spectropolarimeter in accordance with the invention, and FIGS. 5 and 6 illustrate diagrammatically each a different view of another embodiment of a spectropolarimeter in accordance with the invention.

In accordance with the first embodiment of the invention the parallel light ray passes through the polarizer and the analyzer and therefore it is possible to keep the angles of incidence of the light rays small which meet the prisms. When limiting the permissible generating angle to 1°30' one is able—as shown by the full line characteristics in FIG. 2—to work within a wavelength range from 240 Nm. to far above 1000 Nm. with a prism having an angle of intersection $s=39°32'$ which for $\lambda=589$ Nm. is symmetric with reference to $i_1$ and $i_2$. A much greater limitation of the angles of incidence is not possible in view of the constructional form of the instrument. While the instrument is limited in the short wavelength range, the generating angle possible in the long wavelength range is not fully used.

According to another embodiment of the invention of the prism type the polarizer and the analyzer prisms are provided with such an angle of intersections $s$ that $i_1$ for $\lambda=\lambda_{max}$ is about equal to $i_2$ for $\lambda=\lambda_{min}$ wherein $\lambda_{min}$ and $\lambda_{max}$ constitute the shortest and longest wavelength, respectively, of the wavelength range within which the working takes place.

Figure 2:
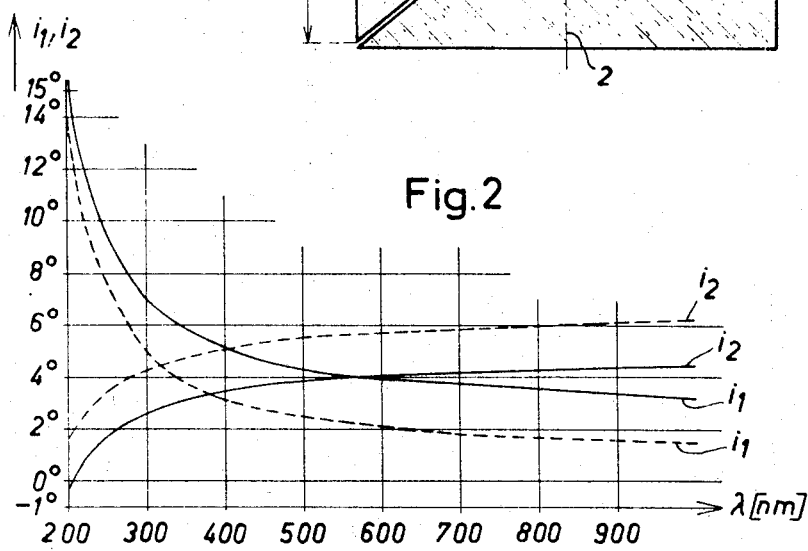
FIG. 2 is a graph illustrating the angle of incidence $i_1$ corresponding to the critical angle of total reflection for the ordinary light ray and the angle $i_2$ for the extraordinary light ray in dependence of the wavelength $\lambda$ in Nm.

The characteristics shown in FIG. 2 in dash lines illustrate the fulfillment of this condition for a wavelength range of 200 Nm. to 1000 Nm. with a prism having an angle of intersection $s=38°23'$ being symmetrical for $\lambda=310$ Nm. In this case the permissible generating angle is 1°30'. If in addition prisms are arranged in the parallel ray beam, in accordance with the first embodiment of the invention, then it is possible not to exceed such a generating angle so that one may work within a wavelength range from 200 Nm. to 1000 Nm. without diminishing the degree of polarisation and the transmission.

Figure 1:
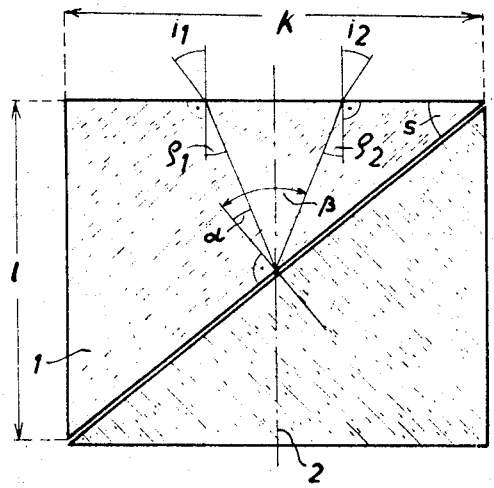
FIG. 1 illustrates a well known Glan prism arrangement.

In order to use with such a limited generating angle the complete, constant light flux of the monochromator, it is required that the surface of the prisms be correspondingly increased. In one of such frequently used monochromators this means that, for instance, the length of the side edge ($k$ in FIG. 1) would have to be 20 mm. and correspondingly the thickness ($l$ in FIG. 1) would have to be 15.8 mm. Calc-spar crystals for such large prisms are, however, not only relatively expensive but are frequently also difficult to obtain.

In the first and second embodiment of the invention the working within a large wavelength range and in particular with relatively short wavelengths is made possible by limiting the permissible generating angle by means of optical elements, such as lenses, and the full utilization of the light flux is obtained by employing additional optical elements and increasing the size of the polarizer and analyzer prisms.

In the fourth embodiment of the invention a different knowledge is applied as is used in FIG. 2. According to FIG. 2, the permissible generating angle $(i_1+i_2)$ of a Glan-prism is displaced in dependence of the wavelength $\lambda$ relative to the optical axis and becomes larger with decreasing wavelength. In the fourth embodiment of the invention, however, a rotation of the monochromator and of the analyzer takes place in such a manner that the center line of the beam of rays of the generating angle $i_1(\lambda)+i_2(\lambda)$ is moved towards the optical axis of the instrument.

Figure 3:
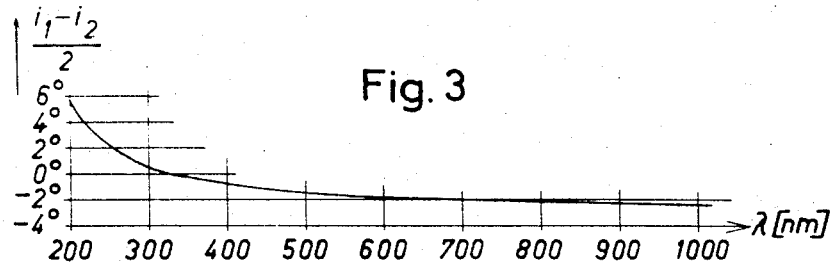
FIG. 3 is a graph illustrating $(i_1-i_2)/2$ in dependence of the wave length for a Glan-prism polarizer designed with an angle of intersection of $s=38°23'$ symmetrically for $\lambda=310$ Nm.

The most favorable conditions are obtained when the polarizer is rotated about an angle $\varphi=\varphi(\lambda)=\frac{1}{2}(i_1-i_2)$, namely according to the characteristic shown in FIG. 3. Then for each wavelength $\lambda$ the axis of the light beam having the generating angle $(i_1+i_2)$ coincides with the optical axis of the spectropolarimeter. The reading accuracy of the polarimeter is not diminished by this rotation of the polarizer. The characteristic in FIG. 3 also indicates in connection with the characteristic shown in dash lines in FIG. 2 that, when the instrument is designed in such a manner that the maximum generating angle of the instrument with respect to the optical axis is .5° smaller than the smallest angle $(i_1+i_2)$, namely for instance ±3.5°, no great requirements are being made on the accuracy of the rotation of the polarizer.

According to one example of the invention, the characteristic $\frac{1}{2}(i_1-i_2)$ is very close to a linear rotation for small wavelengths only, for instance $\lambda<450$ Nm. According to another example of the invention, the characteristic is approached in the same range by a $1/\lambda$ linear rotation.

When the spectropolarimeter is designed for a maximum generating angle of ±3.5°, it is necessary for a full exploitation of the constant light flux of the monochromator in view of the relation between the side length and the permissible generating angle of the light beam that the polarizer has a side length (FIG. 1) of $k=8.6$ mm. In actual practice a polarizer with $k=10$ mm. is employed along with a similar analyzer. As described in connection with the second embodiment of the invention the side length of a similar polarizer, which, however, is not provided with rotating means in accordance with the fourth embodiment of the invention, must be 20 mm. in order to fully utilize the light flux of the monochromator. Accordingly, the thickness $l$ of the Glan-prism should be 7.9 mm. in the fourth embodiment and 15.8 mm. in the second embodiment.

The use of smaller polarizers, as shown in the fourth embodiment of the invention, has still another advantage. Calc-spar crystals show, beginning from a wavelength $\lambda=300$ and lower, a strong increase in absorption which becomes greater with increasing thickness of the crystal. The shortened constructional length of the polarizer employed in the fourth embodiment of the invention has the result that a substantial increase of the light intensity of the instrument is obtained when working within a wavelength range below 230 Nm. In addition, also the other parts of the instrument, such as lenses and Faraday modulator, may be made of a smaller size and this means, of course, a reduction in cost.

In the fourth embodiment of the invention the working within a great wavelength range, particularly with relatively short wavelengths, has the result that by employing mechanical means the permissible generating angle is made to a great extent independent of the wavelength. By employing the known optical systems for polarizers, a certain decrease of the degree of polarization and of the transmission may occur in that also light rays whose inclination exceeds the permissible generating angle, may meet the prisms.

Depending upon the requirements and authorized costs one will choose the first and/or the second or the fourth embodiment of the invention. If all of these three embodiments are combined, i.e. if a spectropolarimeter is employed in which the polarizer and the analyzer are rotatably mounted in the parallel ray beam, then the advantages of all three modifications are obtained. This means that relatively small polarizers, for instance prisms, and other small structural elements may be employed, and yet the complete light flux of the monochromator can be made use of within a great wavelength range and down to relatively short wavelengths without any loss in the transmission and the degree of polarization.

FIG. 4 illustrates diagrammatically a spectropolarimeter comprising a combination of the first, second and the fourth embodiments of the invention. There is shown a monochromator 3, a Glan-prism polarizer 4, a Faraday modulator 8, a Glan-prism analyzer 6 and a photocell 7. The specimen 5 to be examined is arranged in rear of the polarizer 4. In accordance with the first embodiment of the invention, lenses 9 and 9a are arranged in front and in rear of the polarizer 4 and the analyzer 6 so that on one hand the polarizer 4 and the analyzer 6 are arranged in the parallel ray beam as indicated, while on the other hand an image 10' of the monochromator slit 10 is produced in a plane in rear of the specimen 5. In this manner the same optical conditions are created for the analyzer 6 as for the polarizer 4.

According to the fourth embodiment of the invention means are provided for rotating the polarizer 4 about an axis 11, while other means are provided for rotating the analyzer 6 about an axis 12. The axes 11 and 12 extend parallel to the prism edges of the polarizer 4 and of the analyzer 6, namely perpendicular to the optical axis 13 and through the point of intersection of the optical axis 13 and the two hypotenuse faces 14 and 15 of the prism. In the illustrated position in which the prisms are rotated oppositely to each other about an angle of 180° the axes 11 and 12 are parallel to one another. The means for rotating the analyzer 6 can be connected with the means for rotating the polarizer 4 and both means can be connected with one another by conventional means shown in dash lines 16 for rotating the monochromator.

When specimens are examined which when energized by incident light rays will radiate light rays of different wavelengths, then the measuring result is apt to be incorrect. In such cases a second monochromator is arranged, in accordance with the third embodiment of the invention, between the analyzer and the photocell and this prevents the light produced in the specimen from reaching the photocell. The second monochromator consists of an inlet slot, a first lens, a three-edge prism, a second lens and an outlet slot. The second lens, the outlet slot and the photocell should be arranged pivotally as a unit about an axis which extends parallel to the prism edges of the monochromator, or—and this arrangement is to be preferred—the second lens, the outlet slot and the photocell are arranged as a unit at a fixed angle to the optical axis while the prism is rotatable about the same axis of rotation.

The FIGS. 5 and 6 illustrate diagrammatically the use of the invention in a spectropolarimeter provided with a second monochromator in front of the photocell 17 (the front portion of the polarimeter is not shown). In FIG. 5 the prism of the second monochromator is designated with 18, its second lens is designated with 19 and its outlet slot is designated with 20. The optical axis 21 of the elements 19, 20 and 17 is arranged at such an angle with respect to the optical axis 22 of the preceding optical system that only the light of the wavelength coming from the first monochromator strikes the photocell 17. In order to accomplish this the prism 18 has to be mounted pivotally in the direction of the arrow A or reversely, or the arrangement comprising the lens 19, the slot 20 and the photocell 17 should be pivotally mounted in the direction of the arrow B or reversely about a vertical axis 23 which is parallel to the edges of the prism 18 and is perpendicular to the optical axes 22 and 21 in dependence of the wavelength λ of the light coming from the monochromator.

When using the first described embodiment of the invention it is possible to employ, as shown in FIG. 5, the image of the slot 24 of the first monochromator as inlet slot and the lens 26, which is arranged in front of the analyzer 25 and produces the parallel ray beam, as the first lens for the second monochromator.

If according to the fourth embodiment of the invention means are provided for rotating the analyzer 25 about the axis 27, then the means for rotating the prism 18 about the axis 23 may be coupled with the means for rotating the analyzer about the axis 27, as is indicated by the dash lines 28.

FIG. 6 illustrates a modification of the embodiment of FIG. 5, but serving the same purpose. Since the second half of the analyzer serves the only purpose to compensate the refraction of the light rays produced by the first half, namely to produce a straight line optical axis which can be dispensed with anyway when a second monochromator is used, this second half is omitted. The analyzer consists then only of the first half 25a, the hypotenuse face 29 of which faces the photocell 17a. This means that when using the first embodiment of the invention the second monochromator which is arranged in the rear consists of the slot image 24a of the slot of the first monochromator, the lens 26a which produces the parallel ray beam for the analyzer 25a, the analyzer half 25a as a prism, the additional lens 19a and the additional slot 20a. Furthermore, the arrangement comprising the elements 19a, 20a and 17a, or the prism or analyzer 25a respectively are pivotally mounted about an axis 30 which is arranged parallel to the prism edges and perpendicular to the optical axis 22, whereby in the last mentioned case the arrangement comprising the elements 19a, 20a and 17a is then arranged at a fixed angle with respect to the optical axis 20.

When using the fourth embodiment of the invention the means for rotating the second monochromator may be coupled with the means for rotating the analyzer about the axis 30. It has been determined, however, that when rotating the analyzer 25a as a monochromatic prism about the axis 30 at the same time the requirement according to the fourth embodiment of the invention is sufficiently accurately fulfilled, namely that the analyzer be rotated about the angle $$\varphi = \varphi(\lambda) = \tfrac{1}{2}(i_1 - i_2)$$

When therefore both these embodiments of the invention are used at the same time, it is only necessary to rotate the analyzer 25a about the axis 30, while the arrangement comprising the elements 19a, 20a and 17a is mounted at a fixed angle relative to the optical axis 20.

What is claimed:

1. A spectropolarimeter comprising a monochromator with an exit slot, a polarizer, an analyzer and a photosensitive receiver, each of said polarizer and said analyzer having lenses arranged in the front and rear thereof such that said polarizer said said analyzer are each positioned in a parallel ray beam, said lenses forming an image of said exit slot between said polarizer and said analyzer, said polarizer and said analyzer are of the prism type and the angles of intersection $s$ of the polarizer prism and the analyzer prism are so large that $i_1$ for $\lambda = \lambda_{max.}$ is approximately equal to $i_2$ for $\lambda = \lambda_{min.}$ in which $i_1$ and $i_2$ are the angles of incidence of the ordinary light ray and extraordinary light ray respectively, which correspond to the critical angles of total reflection, while $\lambda_{min.}$ and $\lambda_{max.}$ are the shortest and longest wave lengths respectively of the wavelength range in which the working takes place.

2. A spectropolarimeter comprising a monochromator with an exit slot, a polarizer, an analyzer and a photosensitive receiver, each of said polarizer and said analyzer having lenses arranged in the front and rear thereof such that said polarizer and said analyzer are each positioned in a parallel ray beam, said lenses forming an image of said exit slot between said polarizer and said analyzer, in which said polarizer and said analyzer are formed by prisms, and including means for rotating said prism polarizer about an axis which extends parallel to the edges of the prism which are common to both parts of said prism in dependence of the wavelength λ of the light coming from said monochromator so that the entire generating angle of the polarimeter is utilizable without causing a decrease in the degree of polarization and in the light transmission, means for effecting a corresponding rotation of said analyzer, and means for connecting said means for rotating said polarizer with said means for rotating said analyzer.

3. A spectropolarimeter comprising a monochromator with an exit slot, a polarizer, an analyzer and a photosensitive receiver, each of said polarizer and said analyzer having lenses arranged in the front and rear thereof such that said polarizer and said analyzer are each positioned in a parallel ray beam, said lenses forming an image of said exit slot between said polarizer and said analyzer, in which said polarizer and said analyzer are formed by prisms, and including means for rotating said prism polarizer about an axis which extends parallel to the edges of the prism which are common to both parts of said prism in dependence of the wavelength λ of the light coming from said monochromator so that the entire generating angle of the polarimeter is utilizable without causing a decrease in the degree of polarization and in the light transmission, and means for effecting a corresponding rotation of said analyzer, the axes of rotation passing through the point of intersection of the optical axis of said polarimeter with the inner hypotenuse face of the polarizer and of the analyzer respectively.

4. A spectropolarimeter comprising a monochromator with an exit slot, a polarizer, an analyzer and a photosensitive receiver, each of said polarizer and said analyzer having lenses arranged in the front and rear thereof such that said polarizer and said analyzer are each positioned in a parallel ray beam, said lenses forming an image of said exit slot between said polarizer and said analyzer, in which said polarizer and said analyzer are formed by prisms, and including means for rotating said prism polarizer about an axis which extends parallel to the edges of the prism which are common to both parts of said prism in dependence of the wavelength λ of the light coming from said monochromator so that the entire generating angle of the polarimeter is utilizable without causing a decrease in the degree of polarization and in the light transmission, and means for effecting a corresponding rotation of said analyzer, the rotation being effected substantially about an angle $$\varphi = \varphi(\lambda) = \tfrac{1}{2}(i_1 - i_2)$$

in the direction of the absolute smaller one of said two angles $i_1$ and $i_2$, whereby $\sin i_1 = \omega \sin(s-\alpha)$, $\sin i_2 = \epsilon \sin(\beta-s)$ and $s$ denotes the angle of intersection of the prism, and $\omega$ and $\epsilon$ are the indices of refraction, and $\alpha$ and $\beta$ are the critical angles of total reflection of the ordinary and the extraordinary light ray, respectively, and $i_1$ and $i_2$ are the angles of incidence of the ordinary light ray and extraordinary light ray respectively, which correspond to the critical angles of total reflection.

5. A spectropolarimeter comprising a monochromator with an exit slot, a polarizer, an analyzer and a photosensitive receiver, each of said polarizer and said analyzer having lenses arranged in the front and rear thereof such that said polarizer and said analyzer are each positioned in a parallel ray beam, said lenses forming an image of said exit slot between said polarizer and said analyzer, in which said polarizer and said analyzer are formed by prisms, and including means for rotating said prism polarizer about an axis which extends parallel to the edges of the prism which are common to both parts of said prism in dependence of the wavelength λ of the light coming from said monochromator so that the entire generating angle of the polarimeter is utilizable without causing a decrease in the degree of polarization and in the light transmission, and means for effecting a corresponding rotation of said analyzer, said rotation taking place only within the range of shorter wavelengths not exceeding λ=450 Nm.

6. A spectropolarimeter comprising a monochromator, two polarizing elements one of which acts as analyzer while the other acts as polarizer, and a photosensitive receiver, each of said polarizing elements consisting of two prisms with opposed hypotenuse faces, including means for rotating each of said polarizing elements about an axis which extends perpendicularly to the optical axis of the spectropolarimeter through the point of intersection of said optical axis and said hypotenuse faces in a direction parallel to the common edges of the cathetus faces of said prisms of the polarizing element in dependence of the wavelength λ of the light coming from said monochromator, said rotation being effected substantially through an angle $\varphi = \lambda(\lambda) = \tfrac{1}{2}(i_1 - i_2)$ such that the optical axis of the light beam impinging on the polarizing element coincides for each wavelength of a large range of wavelengths with the angle bisector of the angle $i_1 + i_2$, whereby $i_1$ and $i_2$ are the angles of incidence of the ordinary ray and the extraordinary light ray respectively, which correspond to the critical angles of total reflection.

7. A spectropolarimeter according to claim 6 including means for connecting said means for rotating said polarizer with said means for rotating said analyzer.

8. A spectropolarimeter according to claim 6, in which said rotation of said analyzer and said polarizer takes place only within the range of shorter wavelengths not exceeding λ=450 Nm.

9. A spectropolarimeter according to claim 6 in which each of said two polarizing elements has such an angle $s$ of intersection of the part-prisms that $i_1$ for $\lambda = \lambda_{max.}$ is approxiamttely equal to $i_2$ for $\lambda = \lambda_{min.}$, whereby $\lambda_{min.}$ and $\lambda_{max.}$ are the shortest and longest wavelengths respectively of the wavelength range in which the working takes place.

References Cited
UNITED STATES PATENTS 3,155,762   11/1964   Gillham et al. _____ 88—14

JEWELL H. PEDERSEN, *Primary Examiner.*

RONALD L. WILBERT, *Examiner.*